3,582,275
PROCESS FOR THE PREPARATION
OF TITANIUM OXIDE
Yujiro Sugahara, Tokyo, and Hiroyuki Naito, Kouichi Usui, and Akira Takahashi, Tsuruoka-shi, Japan, assignors to Mizusawa Kagaku Kogyo Kabushiki Kaisha, Osaka, Japan
Filed May 31, 1968, Ser. No. 733,708
Claims priority, application Japan, June 3, 1967, 42/35,161
Int. Cl. C01g 23/04, 23/08
U.S. Cl. 23—202      4 Claims

ABSTRACT OF THE DISCLOSURE

A process for the preparation of titanium oxide, especially titanium oxide of rutile type, which comprises mixing a titanium salt of phosphorus oxoacid with at least an equivalent quantity, to the phosphorus oxoacid component in the salt, of at least one phosphorus oxoacid-binder selected from the group consisting of oxides, hydroxides, and salts capable of producing oxides under the subsequent drying or calcining conditions, of alkali metals, alkaline earth metals, aluminium and zinc, and thereafter drying or calcining the mixture.

---

Figure 1A:
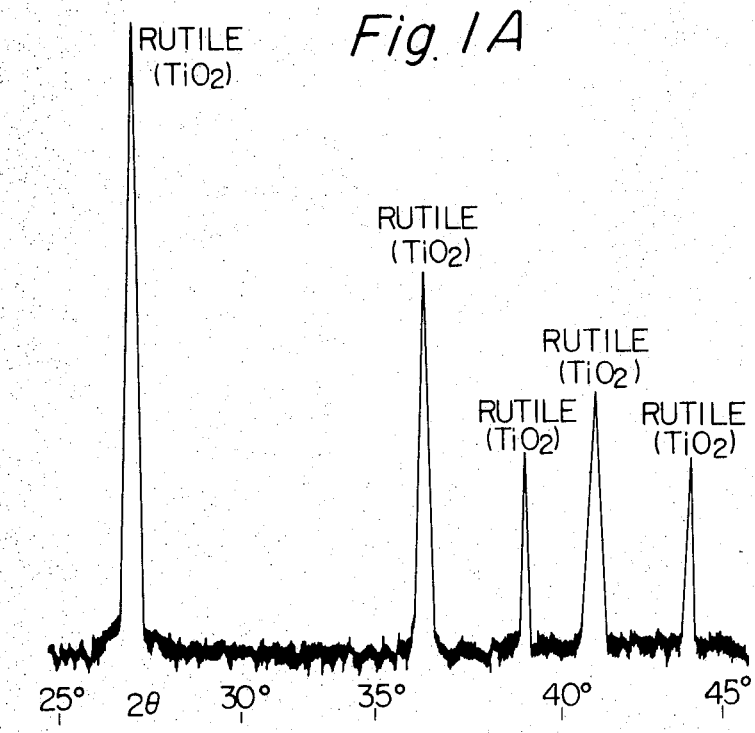
Figure 1B:
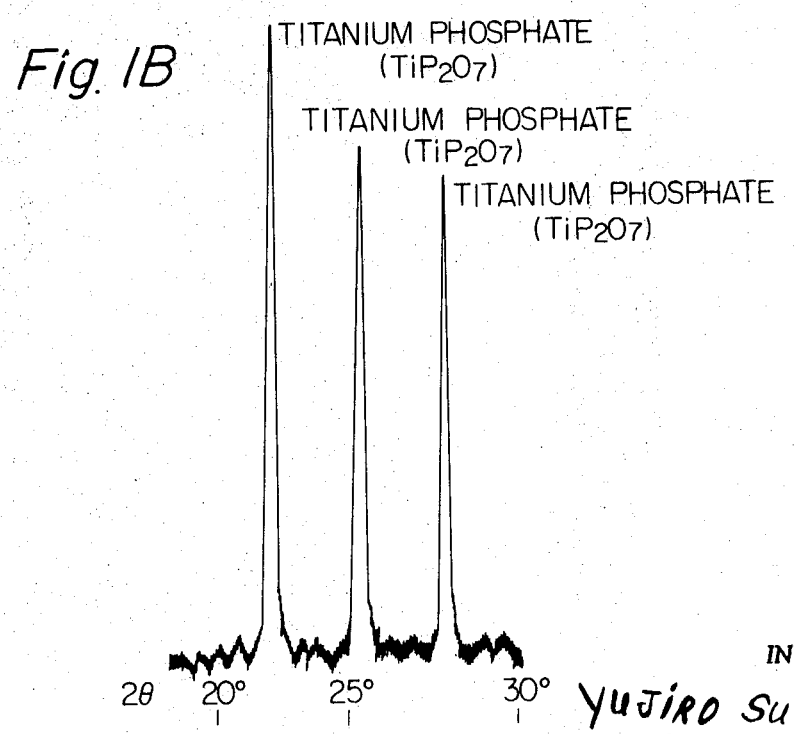
Figure 1C:
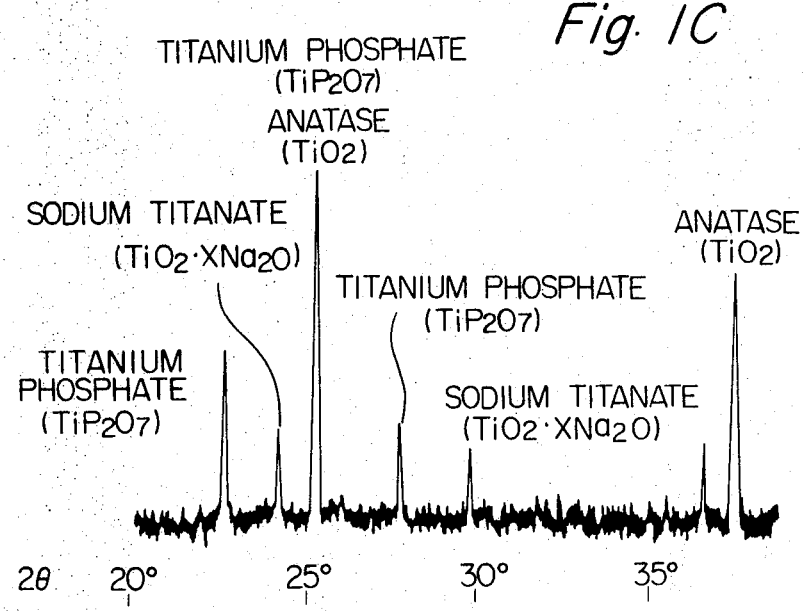
Figure 1D:
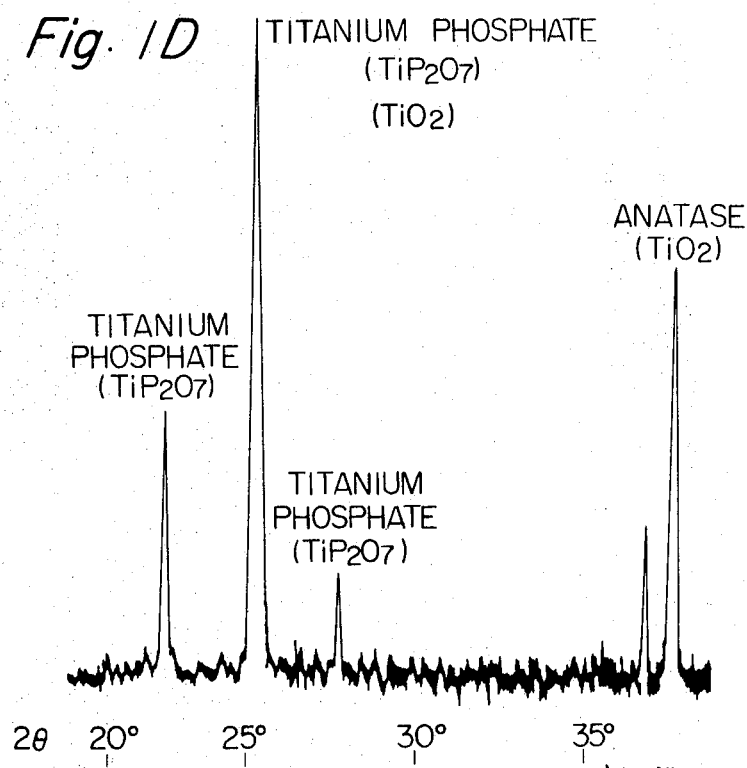

The present invention relates to a novel process for the preparation of titanium oxide.

Titanium oxide is well known for its utility as white pigment, but commercial white pigment from titanium oxide is not quite satisfactorily white. The cause of the insufficient whiteness is due to the traces of metalilc impurities which are contained in the material titanium compounds and transferred into the product titanium oxide. Substantial elimination of such metallic impurities is difficult with presently known techniques. Particularly the separation and elimination of vanadium component among the metallic impurities is most difficult. Whereas, according to our studies, the objectionable coloring of conventional titanium oxide ranging from light yellow to dark brown is caused chiefly by the trace of vanadium (V) component contained therein.

Known methods for industrial preparation of titanium oxide can be classified into two large groups, i.e., sulfuric acid process and chlorine process. For example, those methods proposed in the past include:

(a) A process for the preparation of high purity titanium dioxide which comprises treating titanium ore with sulfuric acid, hydrolyzing under heating the resultant sulfuric acid solution of titanium whereby precipitating hydrate of titanium dioxide, washing and again dissolving the precipitate, and hydrolyzing the same again under heating (Netherlands patent application No. 6410352 (1965); and (b) A process for treating titanium tetrachloride with mineral oil and titanium trichloride to reduce its $VOCl_3$ content to 0.01% (French Pat. No. 1,393,928).

In the first method, titanium dioxide is purified by two-staged hydrolyses with sulfuric acid. However, the titanium dioxide after the first hydrolysis still contains 100–300 p.p.m. of vanadium (V), and re-dissolving thereof in sulfuric acid is extremely difficult. Thus very large quantities of sulfuric acid is required for this procedure, which of course is industrially objectionable. Furthermore, according to the same process the V content cannot be lowered below several p.p.m. after such complex operations.

In the process (b), V content of titanium tetrachloride is reduced during titanium oxide preparation by chloride process. However the $VOCl_3$ content is reduced only to 0.01%, which is by far unsatisfactory for improving the whiteness of titanium oxide. Furthermore, the chlorine process requires expensive chlorine gas, and the titanium oxide obtained by oxidation of titanium tetrachloride readily coagulates. Generally, in this process it is impossible to prevent the formation of the chlorine gas as by-product which causes various troubles.

We previously proposed a process for the preparation of titanium salt of phosphorus oxoacid which is substantially free of metallic impurities, which comprises mixing (a) a solution of a titanium compound in an organic acid or an inorganic acid excluding phosphorus oxoacid, (b) a gaseous or liquid titanium salt, or (c) an amorphous oxide of titanium, said titanium compounds containing metallic impurities, with phosphorus oxoacid or a derivative thereof capable of releasing phosphorus oxoacid radical under the reaction conditions, a free acid being further mixed therewith in case said derivative is used, in the presence of water to form a stable sol or uniformly jellied mass composed of the titanium salt of phosphorus oxoacid; shaping the sol or jellied mass into wet or dry homogeneous small masses such as of flake, sphere and column without filtration with a proviso that in case a sol is formed the shaping is carried out while the sol is converted into a gel; and thereafter extracting the metallic impurities from the said small masses. (U.S. Pat. 3,471,-252 issued Oct. 7, 1969.) The titanium salt of phosphorus oxoacid obtained as in the above exhibit excellent whiteness because metallic impurities are substantially completely eliminated. Accordingly, the product is itself an excellent white pigment, while it is likewise useful as pure starting material for various titanium compounds.

The object of the invention is to provide a process for the preparation of titanium oxide of excellent whiteness and hiding power, from titanium salt of phosphorus oxoacid.

A further object of the invention is to provide a process for the preparation of titanium oxide which is substantially free of metallic impurities and phosphorus oxoacid component which is chemically bonded with the titanium oxide, using as the starting material such titanium salt of phosphorus oxoacid which is easy of purification, by reacting the titanium salt, in dry system, with at least one specific metallic ompound such as hydroxide, oxide or salt which can form oxide under subsequent drying or calcining conditions.

A still further object of the invention is to provide a process for the preparation of titanium oxide in which the product is obtained as fine particles without coagulation.

According to the invention, the foregoing objects are accomplished by the process comprising mixing a titanium salt of phosphorus oxoacid with at least equivalent to the phosphorus oxoacid component of the salt, of an oxide, hydroxide or a salt, which can form the oxide under subsequent drying or calcining conditions, of a metal selected from the group consisting of alkali metals, alkaline earth metals, aluminum and zinc, and thereafter drying or calcining the mixture.

In this invention, titanium salt of phosphorus oxoacid is used as the titanium source. It has been known that the addition of ortho-phosphoric acid or a water-soluble salt thereof to sulfuric acid solution of titanium yields titanium ortho-phosphate (e.g., British Pat. No. 261,051). The titanium salt of phosphorus oxoacid to be used in this invention can be readily prepared by generally reacting, in the presence of water, inorganic or organic acid solution of titanium compound, titanium salt, or amorphous titanium oxide, with phosphorus oxoacid or derivatives thereof.

Any phosphorus oxoacid may be used for the above purpose. For example, ortho-phosphoric acid ($H_3PO_4$), meta-phosphoric acid ($HPO_3$), pyro-phosphoric acid ($H_4P_2O_7$), hexa-metaphosphoric acid [$(HPO_3)_6$], tri-polyphosphoric acid ($H_5P_3O_{10}$), phosphorous acid ($H_3PO_3$), hypophosphorous acid, etc. may be used. Also, in order to provide such phosphorus oxoacid component, derivatives thereof such as anhydrides (e.g., phosphorus pentoxide), halides, oxyhalides, or salts of alkali metals, alkaline earth metals, ammonium, zinc, aluminum, etc. can be used.

The atomic ratio of titanium to phosphorus in the titanium salt of phosphorus oxoacid may vary over a wide range.

Generally speaking, however, when the titanium component in the titanium salt of phosphorus oxoacid is expressed as $TiO_2$ and the phosphorus oxoacid component is expressed as $P_2O_5$, the process is operable when 0.01–3 mols, particularly 0.1–2 mols, of $P_2O_5$ is present per mol of $TiO_2$. Within the above-specified range, presence of phosphorus oxoacid component in the quantities close to the upper limit is economically disadvantageous because such does not appreciably improve the formation rate of titanium oxide, although the side-produced salt of phosphorus oxoacid of the metal employed can be recovered. Whereas, with the phosphorus oxoacid component of the quantity close to the lower limit, the titanium salt of phosphorus oxoacid cannot be obtained in gel form, which renders the small masses of the product and extraction of metallic impurities therefrom difficult. Consequently, use of refined titanium salt of phosphorus oxoacid as the starting material cannot be realized. Accordingly, the particularly preferred mol ratio of $TiO_2$ to $P_2O_5$ in this invention is 1:1.5–0.1.

While optional titanium salt of phosphorus oxoacid can be employed in this invention, it is particularly preferred to use of gel of the titanium salt which is prepared by the above-mentioned steps of forming a liquid mixture composed mainly of a titanium salt of phosphorus oxoacid, shaping the same into small masses of gel and extracting therefrom the metallic impurities contained therein.

By the above process, titanium salt of phosphorus oxoacid which is substantially free of metallic impurities such as Fe, Mo, V, and Cr can be obtained from titanium ores such as ilmenite, iron sand slag, rutile, and high titanium content slag, even when the phosphorus oxoacid source is crude phosphoric acid or refined phosphate rock. Thus the titanium oxide prepared therefrom exhibits high purity which dispenses with subsequent purification.

According to the invention, the above titanium salt of phosphorus oxoacid may be used as it is, or may be first partially removed of the phosphorus oxoacid component by washing with an alkaline aqueous solution.

The form of the starting titanium salt of phosphorus oxoacid is not critical, which may be hydrous gel, dry amorphous gel, or crystals obtained by calcining the gel.

Such titanium salt of phosphorus oxoacid is mixed with at least one equivalent, preferably 1–3 equivalents to the phosphorus oxoacid component in the salt of a metal oxide, hydroxide, or a salt which can form an oxide under the subsequent drying or calcining conditions, the metal being selected from the group consisting of alkali metals, alkaline earth metals, aluminum and zinc, and the mixture is dried or calcined. (The specified group of metallic compounds will be hereafter collectively referred to as phosphorus oxoacid-binder). Under the drying or calcining, the titanium salt of phosphorus oxoacid and the phosphorus oxoacid-binder are reacted at solid phase, and titanium oxide, which is substantially free from phosphorus oxoacid component chemically bonded therewith, is formed.

It is unknown prior to the present invention that high quality titanium oxide can be produced by removing phosphorus oxoacid component from titanium salt of phosphorus oxoacid, for example, titanium phosphate.

As the means to eliminate phosphoric acid component from titanium phosphate, for example, any expert would first think of treating titanium phosphate gel with an alkaline aqueous solution. However, we discovered that with such treatment, it is next to impossible to substantially completely eliminate the phosphoric acid component from the titanium phosphate gel, although it may perform partial elution and elimination of the component. Generally by such treatment, the phosphorus oxoacid component chemically bonded with titanium oxide is bound to remain in the gel. Furthermore, the gel remaining after the treatment with alkaline aqueous solution does not give titanium oxide of high hiding power and high rutile-type crystal even after the subsequent calcining treatment at such high temperatures as 1,000° C.

Surprisingly, however, we found that when the titanium salt of phosphorus oxoacid is mixed with an oxide, hydroxide or a salt which can form an oxide under subsequent drying or calcining conditions, such as carbonate, of any of the above-specified metals, in the optional presence of water, and the resultant mixture is dried or calcined, the both react very well to form the titanium oxide which is substantially free of the phosphorus oxoacid component chemically bonded therewith.

For better understanding reference may be made to the appended drawings.

Figure 2:
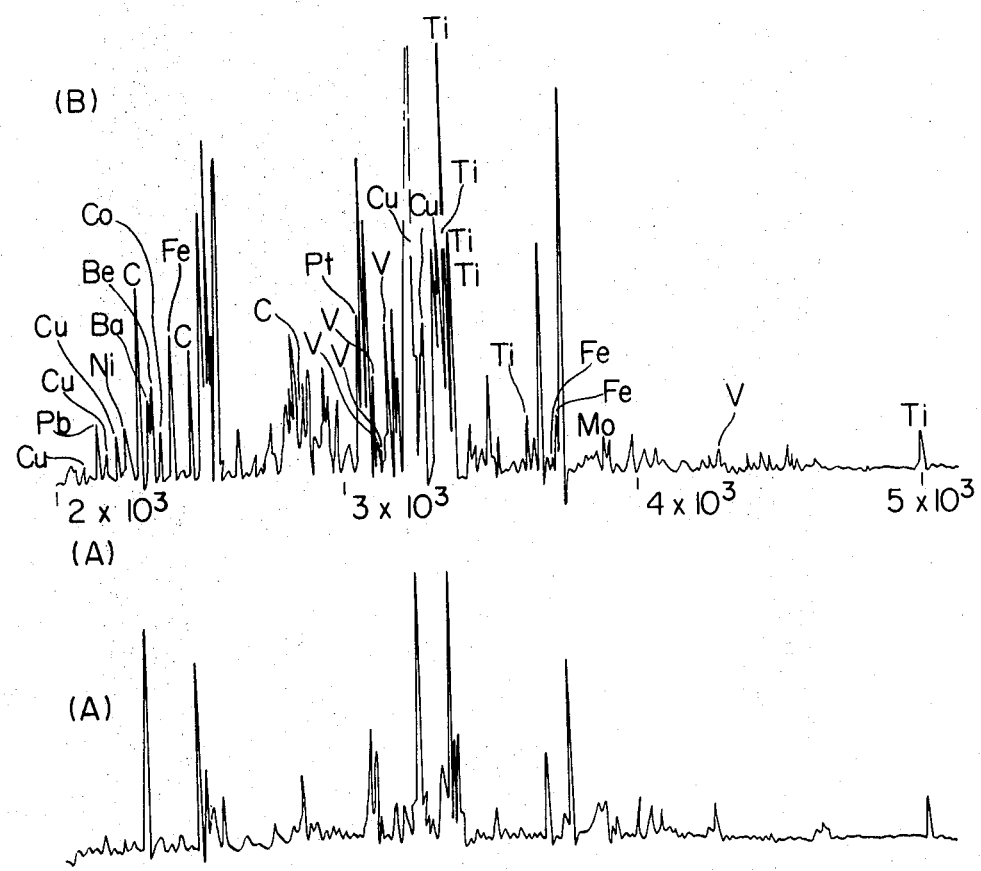

In the drawings, FIG. 1 shows X-ray diffraction diagrams, FIG. 1–A being the X-ray diffraction diagram of titanium oxide within the scope of this invention, FIG. 1–B being that of the starting titanium phosphate material, FIG. 1–C being that of the titanium phosphate eluted with an aqueous solution of caustic soda and FIG. 1–D being that of the titanium phosphate eluted with aqueous ammonia; and FIG. 2 shows the spectra resulted from emission spectroanalyses of titanium oxide (A) within this invention and titanium oxide commercially available (B).

We carried out the following experiments under the conditions given in Table 1, in order to confirm the above discovery. To wit, the titanium phosphate gel prepared in the later given Example 1–A was used as the test sample. When it was washed with aqueous ammonia of pH 10 or 10% aqueous NaOH (controls A and B, respectively), approximately 10% of the phosphoric acid component in the starting material remained after 24 hours' treatment as shown in Table 1, and the complete removal thereof was impossible. Also the calcined products obtained by calcining the products of the controls A and B at 1050° C. for 30 minutes contained titanium phosphate, anatase-type titanium oxide, and sodium titanate (control B), etc. as indicated in the X-ray diffraction diagram given as FIGS. 1–C and 1–D. The calcined products furthermore exhibited rather low hiding power. In contrast thereto, the phosphoric acid component in the starting titanium phosphate is substantially completely removed according to the process employed in Example 1, and the product after 30 minutes of calcining at 1050° C. was almost perfectly pure rutile titanium oxide as indicated in FIG. 1–A. It also exhibited an excellent hiding power.

TABLE 1

| | Control A | Control B | Example 1 |
|---|---|---|---|
| Treating conditions: | | | |
| Alkali | Aqueous ammonia (ph 10). | 10% aqueous caustic soda | Caustic soda. |
| Quantity of alkali (per mol of $P_2O_5$ content). | 60 mol times | 60 mol times | 60 mol times (equivalent to phosphoric acid component). |
| Treating time (hr.) | 24 | 24 | 1. |
| De-phosphoric acid ratio (percent). | 88 | 91 | 100. |
| Composition of calcined product (wt. percent). | $TiO_2$, 93.3; $P_2O_5$, 6.5. | $TiO_2$, 92.0; $P_2O_5$, 4.9; $Na_2O$, 2.9. | $TiO_2$, 99.8% or above (rutile type). |
| Hiding power | 8.5 | 7.2 | 3.3. |

As the phosphorus oxoacid-binder useful for the present invention, oxides, hydroxides, and salts which can form the oxides under the subsequent drying or calcining conditions, such as carbonate, of alkali metals such as lithium, sodium and potassium; alkaline earth metals such as magnesium, calcium and barium; zinc and aluminum can be named. Among those binders, oxides and hydroxides of those metals are employed with advantageous yields of titanium oxide. It should be apparent to the experts, however, that the use of carbonates, nitrites, nitrates, halides and organic acid salts of the foregoing metals is likewise effective when the mixture of such a salt with titanium salt of phosphorus oxoacid is dried or calcined at high temperatures. In case a halide is used as the acid-binder, it may be necessary to carry out the calcination in an oxygen or oxygen-containing atmosphere.

Specific examples of the phosphorus oxoacid binders include: $NaOH$, $Na_2O$, $Na_2CO_3$, $NaHCO_3$, $NaNO_2$, $(COONa)_2$, $HCOONa$, $CH_3COONa$, $KOH$, $K_2O$, $LiOH$, $CaO$, $Ca(OH)_2$, $CaCO_3$, $Ba(OH)_2$, $Mgo$, $Mg(OH)_2$, $MgCO_3$, $ZnO$, $Zn(OH)_2$, $Al(OH)_3$, $CaCl_2$, $NaCl_2$, $CaBr_2$, etc. It is of course permissible to use more than one of those binders simultaneously.

In accordance with the invention, the titanium salt of phosphorus oxoacid and at least equivalent, to the phosphorus oxoacid component of the salt, of the above binder are first intimately mixed or blended. In that case, if the materials are solid, they may be ground and mixed in dry system to form an intimate mixture. Wet-system grinding and mixing with the use of a liquid medium is also permissible. The phosphorus oxoacid-binder may be dissolved in the liquid medium in advance. If a wet system is employed, the product is later dried. Furthermore, when hydrous gel of titanium salt of phosphorus oxoacid is used, it is mixed with the phosphorus oxoacid-binder to form a pasty mixture, which is subsequently dried. In any of the foregoing cases the mixture may be shaped into optional small masses such as of plate, flake, pellet, sphere, tablet, etc. in advance. Such advance shaping of the mixture is preferred for facilitating the drying, calcining or eluting operation of the produced oxoacid salt of phosphorus.

Or, the hydrous gel of titanium salt of phosphorus oxoacid may be immersed in a high concentration aqueous solution of the phosphorus oxoacid-binder so that the agent may be contained in the gel, and thereafter the gel is dried to form granular, solid intimate mixture.

According to the invention, the mixture of titanium salt of phosphorus oxoacid with phosphorus oxoacid-binder prepared as in the above is dried or calcined. The drying or calcining conditions differ, depending on the state of the titanium salt employed, and the type of the binder. Generally speaking, however, the mixture is left in the atmosphere of room temeprature to 1100° C., preferably 50 to 1100° C. or heated to such temperatures. The time required for the reaction of the two varies appreciably, depending on the drying or calcining temperature, but normally it is within the order of 10 minutes to a week. It is important in this invention that when the mixture of the titanium salt with the binder contains water, or yields free water upon reacting, drying or calcining conditions as will cause the volatilization of the water content should be selected.

For instance, when hydrous gel, wet gel, or dry amorphous gel of titanium salt of phosphorus oxoacid is used, and the mixture thereof with the binder is slurry-like or in moistened state, the mixture is left in drying atmosphere at room temperature, or heated to above room temperature so that the water content of the mixture should be volatilized. Surprisingly, however, it is discovered that according to the present invention, the phosphorus oxoacid component chemically bonded with titanium oxide is substantially completely removed even when approximately 35 wt. percent of water content remained in the reaction mixture after the drying. The time required for the drying is of course extended at lower temperatures. In consideration thereof, it is preferred in this invention to use the temperatures ranging from 50–400° C., particularly from 80–200° C. for 20 minutes—3 hours, when the form of the titanium salt of phosphorus oxoacid is hydrous gel, wet gel or dry amorphous gel.

Whereas, when completely dried crystal or calcined product is used as the titanium salt of phosphorus oxoacid and/or a salt such as carbonate is used as the phosphorus oxoacid-binder, calcining of the the mixture at 400–1100° C., particularly 500–900° C., for 20 minutes to an hour is recommended in order to achieve a complete reaction of the titanium salt with the binder.

Specific conditions for the drying to achieve the substantially complete removal of the phosphorus oxoacid component chemically bonded with titanium oxide from the mixture of titanium salt of phosphorus oxoacid and phosphorus oxoacid-binder can be easily determined by the expert with simple experiment in each individual case, based on the foregoing disclosures.

Thus obtained reaction mixture consists of titanium oxide which is substantially free of phosphorus oxoacid chemically bonded therewith, and phosphorus oxoacid salt of the metal of the binder employed. The isolation of the titanium oxide from the reaction mixture can be accomplished by the means known per se. As a most common means, pure titanium oxide can be isolated by elution of the phosphorus oxoacid salt of alkali metal, alkaline earth metal, aluminium or zinc into suitable extraction liquid. As the extraction medium, water or aqueous inorganic or organic acid can be used. Water and aqueous mineral acids such as hydrochloric acid are most preferred.

For example, when an alkali metal compound is used as the phosphorus oxoacid binder, the reaction mixture can be immersed in water or an aqueous acid so that the alkali metal salt of phosphorus oxoacid may be substantially completely eliminated by the process of elution. On the other hand, when compounds of alkaline earth metal, zinc or aluminium are used as the phosphorus oxoacid-binder, the reaction mixtures are immersed in aqueous solutions of acids which will dissolve the side-produced phosphorus oxoacid salt, such as aqueous hydrochloric acid. The resutling slurry of titanium oxide is separated and recovered by filtration, centrifugal separation, decantation and other suitable procedures, and if necessary, is washed with water.

When a mixture of a titanium salt of phosphorus oxoacid and a phosphorus oxoacid-binder is calcined at a temperature of from 800 to 1100° C., the resulting titanium oxide is, in many cases, in a form of rutile type crystal, and hence, it can be applied to the final use as it is. In case titanium oxide of completely rutile type which is useful for the pigment is intended, whether the mixture has been dried at lower temperatures or calcined at higher temperatures, it is preferred to calcine the resulting titanium oxide at a temperature of 800 to 1100° C. over a period of from 30 minutes to 2 hours.

In case the mixture is dried at lower temperatures, the resulting titanium oxide is amorphous, and useful as the starting material for the synthesis of various titanium compounds.

According to the invention, the titanium oxide is obtained as very finely dispersed in the side-produced phosphorus oxoacid salt. Therefore the primary particles of the titanium oxide (prior to the drying or calcined) is extremely fine in size, and shows substantially no tendency for agglomeration neither after the drying or calcining. The dried or calcined grains can be easily reduced in particle size by simple grinding. As the result, the titanium oxide produced in accordance with the invention exhibits markedly excellent hiding power due to the fine particle size.

Furthermore, when the metallic impurities-free titanium salt of phosphorus oxoacid and refined phosphorus oxoacid binder are employed in accordance with the preferred embodiment of the invention, the product titanium oxide contains substantially no metallic impurities. In fact it is confirmed that the selection of such titanium salt of phosphorus oxoacid, from which the metallic impurities can be very easily removed by extraction, as the starting material, contributed to the formation of titanium oxide whose metallic impurities content is not detectable even with emission spectroanalysis. That is, the product contains metallic impurities such as Fe, Mo, V, Cr, etc. only in such trace quantities as no more than 1.0 p.p.m., or less than 0.1 p.p.m. Consequently, the product provides pigment of excellent whiteness and covering power, as well as excellent starting material for various titanium compounds.

The titanium oxide obtained according to this invention can be dried or calcined by conventional means, and used for various usages of pigment as rutile- and/or anatase-type titanium oxide.

Furthermore, when alkaline earth metal, zinc or aluminium compound is used as the phosphorus oxoacid-binder in accordance with the invention, resultingly side-produced phosphorus oxoacid salts of those metals may be left in the reaction mixture omitting the positive elimination step. The product in such a case is valuable for various pigment usages, as complex pigment with titanium oxide.

The invention will be explained in further detail hereinbelow, with reference to the following working examples.

EXAMPLE 1

Preparation of titanium oxide by drying a mixture of titanium phosphate gel prepared from iron sand slag with caustic soda at 100° C. is explained in this example.

(A) Preparation of titanium phosphate gel

A mixture consisting of 1 kg. of iron sand slag powder, 1 liter of conc. sulfuric acid and 2 liters of water was heated for approximately an hour. After the components were thus reacted the resultant solution was diluted with water, and the unreacted components, silicic acid component and gypsum were filtered. Thus recovered sulfuric acid solution if titanium salt had the composition as follows:

| Component: | G./100 ml. |
|---|---|
| $TiO_2$ | 8.55 |
| $Ti_2O_3$ | 0.148 |
| $Fe_2O_3$ | 1.49 |
| $Al_2O_3$ | 3.23 |
| MgO | 1.39 |
| $V_2O_5$ | 0.0454 |
| $Cr_2O_3$ | 0.0022 |
| Mn | 0.338 |
| Free sulfuric acid | 1.53 |
| Specific gravity (at 20° C.) | 1.40 |

To 1000 ml. of the above surfuric acid solution of titanium salt, 150 ml. of commercial, extra-pure orthophosphoric acid (specific gravity: 1.690, $H_3PO_4$ content: 85.0%) was added at room temperature under agitation, to form a homogeneous sol mixture. The mixture was let stand for approximately an hour. Thereupon the product was converted to blackish purple jelly of wet gel composed chiefly of titanium phosphate gel, which was hardened to such a degree that pushing with a finger would not deform the jelly mass. The jelly was shaped into column-like small masses of approximately 1.5 mm. in diameter, which were placed in a washing tower and extracted of the metallic impurities contained therein, with aqueous sulfuric acid of pH 0.5 and that of 30 g./100 ml. sulfuric acid concentration. The remaining system was washed with water. The water pick-up of the resultant wet gel was removed by means of a hydraulic press. Thus wet titanium phosphate gel containing substantially no metallic impurities was obtained at such a high yield of 99.0% to the titanium component in the titanium salt solution.

The metallic impurities contents of the above titanium phosphate were determined with an emission spectrophotometer, which confirmed the substantial absence of normally found metallic impurities such as vanadium, iron, aluminium and lead. Also the quantitative analysis of the titanium phosphate gel revealed that the mol ratio of $TiO_2:P_2O_5$ was 1.51:1. The water content of the wet gel of titanium phosphate (dried at 110° C. for 3 hours) was 71.0%.

(B) Drying of the mixture of titanium phosphate gel with caustic soda at 100° C.

One hundred (100) g. of the substantially refined titanium phosphate gel as prepared in the above (water content: 71.0%) was thoroughly and intimately mixed with 28.0 g. of commercial reagent, special pure sodium hydroxide (granular product, sodium hydroxide content: 95.0%) in a mortar. In this case, the mol ratio in the mixture of sodium hydroxide (NaOH) to the phosphoric acid component ($P_2O_5$) in the titanium phosphate (NaOH/$P_2O_5$) was approximately 6, which corresponds to the equivalent to the phosphoric acid content. During the mixing, the water content of the titanium phosphate gel functioned as the blending medium. Thus a pasty, intimate mixture was formed.

The mixture was poured into a vat, and thoroughly dried for an hour in a drying oven maintained at 100° C. Whereupon the mixture was converted to dry flakes. Thus the reaction of the phosphoric acid component in the starting titanium phosphate gel with caustic soda was completed. The resultant flaky grains was a dry matter which could be easily crumbled with finger tips.

(C) Isolation of titanium oxide from the dry matter

Thus obtained dry matter was thrown into water, and the by-produced sodium phosphate was eluted. The resultant solution was removed from the system by filtration, and the remaining precipitate was washed with water. The washing was continued until phosphoric acid component became no more detectable in the washings. The titanium oxide thus washed was then calcined for 30 minutes at 1050° C.

The crystal type of the titanium oxide was identified by means of X-ray diffraction. The result is given in Table 2 below, together with the measured results of its hiding power, degree of whiteness (reflectivities at various wave lengths), and contents of metallic impurities. For comparison, similar identification and measurement results of commercial rutile-type titanium oxide are also given in Table 2.

TABLE 2

|  | Titanium oxide product of Example 1 | Commercial rutile-type titanium oxide |
| --- | --- | --- |
| X-ray diffraction diagram | Rutile | Rutile |
| Hiding power | 3.3 | 3.7 |
| Reflectivity (percent), wave length m$\mu$: |  |  |
| 350 | 16.7 | 7.7 |
| 400 | 65.0 | 42.8 |
| 500 | 98.0 | 93.7 |
| 600 | 98.5 | 94.0 |
| Metallic impurities, contents: |  |  |
| V | − | + |
| Fe | − | ++ |
| Al | − | + |
| Pb | − | + |

NOTE.—Hiding power=Procedure A of hiding power measurement in the pigment testing method 6 of JIS. K5101–1964 was followed. To wit, 3 ml. of boiled linseed oil was added to 3 g. of the test sample, and kneaded by Hoover muller by four times of each 25 rotations. The hiding power of thus obtained pasty sample was measured with a cryptmeter. The hiding power was expressed by the graduation value (mm.) at which the boundary line on the graduated plate became recognizable. Therefore, the less is the graduation value, the better is the hiding power. Reflectivity=The reflectivity measurement method by powder process using a spectrophotometer was employed. Accordingly, the reflectivity was expressed by index values when that of the standard alumina plate was set to be 100. Impurities contents=The metallic impurities were detected with an emission spectrophotometer. The negative sign (−) indicates that the quantity was substantially non-detectable by the emission spectroanalysis; the (±) sign indicates that a trace quantity was detected in the same analysis; single positive sign (+) indicates that the detected quantity was appreciable; and double positive sign (++) indicates particularly large quantity was detected. The emission spectrophotometric spectra of the titanium oxide of Example 1 and the commercial rutile titanium oxide are given in FIG. 2.

From the above-given test results, it can be understood that the titanium oxide prepared as in Example 1 was of excellent rutile crystals, and had excellent hiding power and whiteness, particularly the reflectivity at the ultraviolet portion (wave length=350 m$\mu$), as compared with commercial rutile-type titanium oxide. It can also be understood that the metallic impurities were substantially non-detectable by emission spectroanalysis. The calcined product of the titanium oxide product of this example was confirmed to be very easy of grinding, and exhibited no coagulation of titanium oxide particles.

The side-produced sodium phosphate also had a high purity, and could be used as the starting material of various sodium salts of phosphorus oxoacid, for example, sodium tripolyphosphate. It has still other various utilities as a source of high purity phosphoric acid component. Incidentally, the recovery ratio of the phosphoric acid component in this example was 100%.

EXAMPLE 2

Preparation of titanium oxide by calcining a mixture of titanium phosphate gel obtained from ilmenite rock with calcium hydroxide (slaked lime) at 900° C. is explained in this example.

(A) Preparation of titanium phosphate gel

Ilmenite rock was sufficiently ground, and 1 kg. of the ground rock which passed through a 300-mesh sieve was formed into a slurry by addition of 0.5 liter of water and subsequent agitation. Then 1.2 kg. of conc. sulfuric acid was added to the slurry, and the system was heated for 2 hours at high temperatures, the highest being 140° C. After the reaction, the system was diluted with water while the former still retained porridge-like fluidity. Removing the unreacted substances, etc. by filtration, sulfuric acid solution of titanium salt was recovered at a ratio of approximately 90%. The solution was furthermore cooled, and its iron component was eliminated as crystals of the formula, $FeSO_4 \cdot 7H_2O$.

The composition of thus obtained sulfuric acid solution of titanium salt was as follows.

| Component: | (G./100 ml.) |
| --- | --- |
| $TiO_2$ | 25.6 |
| $Fe_2O_3$ | 16.2 |
| $Al_2O_3$ | 2.02 |
| MgO | 1.80 |
| $V_2O_5$ | 0.040 |
| $Cr_2O_3$ | 0.0022 |
| Mn | 0.18 |
| Free sulfuric acid | 18.4 |

To 1,000 ml. of the above sulfuric acid solution, 450 ml. of commercial extra pure ortho-phosphoric acid (specific gravity: 1.690, $H_3PO_4$ content: 85.0) was added at room temperature under stirring. The resultant sol mixture was poured into a vat and heated at 80° C., to be converted to semi-dried gel flakes composed mainly of titanium phosphate. The flaky gel was put in a washing tower, and in which the metallic impurities in the gel was extracted, using aqueous sulfuric acid of pH 0.5 and that of 30 g./100 ml. sulfuric acid concentration. The gel was then washed with water, and the water pick-up of the resultant wet gel was removed with a hydraulic press. Thus wet gel of titanium phosphate containing substantially no metallic impurities was obtained at a high yield of 98.7%, based on the titanium component in the titanium salt solution. The emission spectroanalysis of the wet gel of titanium phosphate confirmed the substantial absence of common metallic impurities such as vanadium, iron, aluminum, lead, etc. The quantitative analysis of the same gel showed that the mol ratio of $TiO_2:P_2O_5$ was 1.47:1. The water content of the wet gel was 70.5% (after 3 hours of drying for 3 hours at 110° C.).

(B) Calcination of the mixture of titanium phosphate gel with calcium hydroxide One hundred (100) g. of the substantially refined titanium phosphate gel as prepared in the above (water content: 70.5%) was thoroughly and intimately blended with 63 g. of calcium hydroxide which was prepared by purifying commercial extra pure reagent calcium hydroxide, in a mortar. The mol ratio in the mixture of the calcium hydroxide $[Ca(OH)_2]$ to the phosphoric acid component $(P_2O_5)$ was approximately 3 $[Ca(OH)_2/P_2O_5]$, which corresponded to the equivalent to the phosphoric acid content. Since the water content of the titanium phosphate gel functioned as the blending medium in this case, the two components formed a pasty, intimate blend.

The blend was poured into a porcelain crucible and dried, followed by an hour's calcining at 900° C. in an electric oven. Thereupon the blend was converted to calcined masses, indicating the completion of the reaction between the phosphoric acid component in the starting titanium phosphate gel and calcium hydroxide.

(C) Isolation of titanium oxide from the calcined product

The calcined product was thrown into 10% aqueous hydrochloric acid to cause the elution of calcium phosphate which was side-produced of the previous reaction. The solution was filtered off, and the remaining precipitate was washed with 10% aqueous hydrochloric acid, and then with water. The washing was continued until phosphoric acid or hydrochloric acid component became no more detectable in the washings. Thus cleaned titanium oxide was dried at 110° C.

The crystal type of this titanium oxide was identified by means of X-ray diffraction. At the same time, its hiding power, whiteness and metallic impurities contents were measured. The results are given in Table 3 below.

TABLE 3

|  | Titanium oxide product of Example 2 |
| --- | --- |
| X-ray diffraction diagram | Rutile |
| Hiding power | 3.4 |
| Reflectivity (percent), wave length mµ: | |
| 350 | 20.5 |
| 400 | 80.5 |
| 500 | 95.5 |
| 600 | 96.0 |
| Metallic impurities, contents: | |
| V | — |
| Fe | — |
| Al | — |
| Pb | — |

From the above table, it can be understood that the product of this example again has excellent rutile-type crystalline structure, and has high hiding power and whiteness. Particularly its reflectivity at ultraviolet portion is good. Metallic impurities are substantially non-detectable. The product was obtained as fine particles.

Also the side-produced phosphate is useful as a source material for phosphoric acid component of titanium phosphate. The recovering ratio of the phosphoric acid component was 100%.

EXAMPLE 3

Preparation of titanium oxide from titanium salts of phosphorus oxoacids prepared from various phosphorus oxoacids or derivatives thereof and lime is explained in this example.

(A) Preparation of various titanium salts of phosphorous oxoacids

The free sulfuric acid content of the sulfuric acid solution of titanium salt which was recovered in procedure A of Example 1 was adjusted to approximately 10.0 g./100 ml. To the solution, various phosphorus oxoacids or derivatives thereof as identified in Table 4 were added, each in such a quantity that its phosphoric acid component expressed as $P_2O_5$ was equimolar to the titanium component as $TiO_2$ in the solution. Thus formed homogeneous liquid mixtures were then converted to granular gels. The gels were extracted of metallic impurities by aqueous sulfuric acid solutions of pH 0.5 and of a concentration of 30 g./100 ml., and washed with water. Thus substantially refined gels of titanium salts of phosphorus oxoacids were prepared.

The rock of phosphorus used as one of the phosphorus oxoacid salts was prepared from that produced in Florida, U.S.A., which was thoroughly ground in wet system, subjected to hydraulic elutriation, and removed of a part of its iron content by means of magnetic separation. Its main composition was as follows:

|  | Percent |
| --- | --- |
| $P_2O_5$ | 35.6 |
| $Fe_2O_3$ | 0.15 |
| $Al_2O_3$ | 1.44 |
| CaO | 50.4 |
| MgO | 0.87 |
| F | 3.90 |
| $SiO_2$ | 4.50 |

When the above rock of phosphorus and other phosphorus oxoacid salts were used, at least equivalent to the phosphorus oxoacid salt of sulfuric acid was added to each system in advance.

As the crude phosphoric acid solution, that obtained by sulfuric acid treatment of rock of phosphorus produced in Kola, U.S.S.R., was used without refining. The main composition of the solution was as follows:

|  | Percent |
| --- | --- |
| $P_2O_5$ | 34.9 |
| MgO | 0.18 |
| $Fe_2O_3$ | 0.53 |
| $Al_2O_3$ | 0.58 |
| F | 0.27 |

In the preparations of gels composed mainly of titanium salts of phosphorus oxoacids from rock of phosphorus, calcium phosphate and crude phosphoric acid, aqueous hydrochloric acid of pH 0.5 was used as the extraction medium for the elimination of metallic impurities from the gels.

Thus obtained gels of titanium salts of phosphorus oxoacids were subjected to emission spectroanalysis to be determined of their metallic impurities contents. The analysis confirmed that all of the gels were substantially completely free of such impurities as vanadium, iron, aluminium and lead.

(B) Calcination of the blends of gels of titanium salts of phosphorus oxoacids with lime Each of the substantially refined gels obtained as in the above was intimately mixed with lime (CaO) at the mixing ratio of 3 mols of lime per mol of phosphoric acid component ($P_2O_5$) in the gel. Each system was then dried, put in a porcelain crucible and calcined for an hour at 900° C. in an electric oven. Whereupon the reaction in each system was completed.

(C) Isolation of titanium oxide from each calcined product

From each of the calcined products the calcium salt of phosphorus oxoacid was washed off in accordance with the procedure C of Example 2. The resultant titanium oxides containing no phosphoric acid component were dried at 110° C.

The crystal type of the products was identified by means of X-ray diffraction. At the same time, their hiding power, whiteness and metallic impurities contents were measured. The results are given in Table 4, together with recovery ratio of phosphoric acid in each case.

From the results as indicated in the same table, it can be understood that the titanium oxide prepared in accordance with the invention invariably exhibits excellent performance, regardless the specific type of phosphorus oxoacid component in the titanium salt.

TABLE 4

| Gel of titanium salt of phosphorus oxoacid | | | Product titanium oxide | | | | | | | | | Recovery of phosphoric acid component (percent) |
| --- | --- | --- | --- | --- | --- | --- | --- | --- | --- | --- | --- | --- |
| Phosphoric acid component | $TiO_2:P_2O_5$ (mol ratio) | Hiding power | Reflectivity (percent), wave length mµ of— | | | | X-ray diffraction diagram | Metallic impurities of— | | | | |
| | | | 350 | 400 | 500 | 600 | | V | Fe | Al | Pb | |
| o-Phosphoric acid ($H_3PO_4$) | 1.5:1 | 3.3 | 17.3 | 64.0 | 97.2 | 98.0 | Rutile | — | — | — | — | 100 |
| m-Phosphoric acid ($HPO_3$) | 1.5:1 | 3.3 | 17.5 | 64.5 | 97.0 | 97.5 | do | — | — | — | — | 100 |
| Pyro-phosphoric acid ($H_4P_2O_7$) | 1.5:1 | 3.3 | 16.5 | 64.0 | 97.5 | 98.0 | do | — | — | — | — | 100 |
| Sodium-o-phosphate ($Na_2HPO_4 \cdot 12H_2O$) | 1.5:1 | 3.4 | 15.4 | 51.9 | 96.0 | 96.5 | do | — | — | — | — | 100 |
| Sodium m-phosphate ($NaPO_3$) | 1.6:1 | 3.4 | 15.5 | 49.1 | 95.7 | 96.0 | do | — | — | — | — | 100 |
| Sodium pyro-phosphate ($Na_4P_2O_7$) | 1.4:1 | 3.4 | 16.0 | 55.5 | 96.0 | 96.5 | do | — | — | — | — | 100 |
| Calcium o-phosphate [$Ca_3(PO_4)_2$] | 1.4:1 | 3.5 | 14.3 | 69.2 | 96.4 | 97.0 | do | — | — | — | — | 100 |
| Ammonium o-phosphate [$(NH_4)_2HPO_4$] | 1.4:1 | 3.4 | 17.0 | 60.5 | 96.5 | 96.5 | do | — | — | — | — | 100 |
| Sodium tripolyphosphate ($Na_5P_3O_{10}$) | 1.5:1 | 3.4 | 15.0 | 61.0 | 96.0 | 96.5 | do | — | — | — | — | 100 |
| Sodium phosphite ($Na_2HPO_3$) | 1.2:1 | 3.4 | 12.3 | 49.5 | 96.0 | 97.0 | do | — | — | — | — | 100 |
| Phosphorous acid ($H_3PO_3$) | 1.2:1 | 3.4 | 15.5 | 62.0 | 96.0 | 96.5 | do | — | — | — | — | 100 |
| Rock of phosphorus | 1.5:1 | 3.5 | 13.5 | 67.0 | 96.0 | 96.5 | do | — | — | — | — | 100 |
| Crude phosphoric acid solution | 1.5:1 | 3.4 | 17.0 | 65.0 | 97.0 | 97.5 | do | — | — | — | — | 100 |

EXAMPLE 4

Preparation of titanium oxide with various mol ratios of $TiO_2:P_2O_5$ in titanium phosphate gels is explained in this example.

(A) Preparation of titanium phosphate gels of various compositions

The free sulfuric acid content of the sulfuric acid solution of titanium salt containing metallic impurities, as obtained in procedure A of Example 1, was adjusted to 10.0 g./100 ml. To each 100 ml. of the solution, respectively 2.1 ml., 3.1 ml., 3.6 ml., 5.1 ml., 15.0 ml. and 30.0 ml. of commercial extra pure ortho-phosphoric acid was added, and each system was formed into a homogeneous liquid mixture. Following the procedures described in procedure A of Example 1, titanium phosphate gels of various $TiO_2:P_2O_5$ mol ratios which were substantially free of metallic impurities were prepared. Also similar samples of different $TiO_2:P_2O_5$ mol ratios were prepared by eliminating, from substantially refined titanium phosphate gel prepared with the use of 5.1 ml. of orthophosphoric acid, its phosphoric acid component with aqueous ammonia. The $TiO_2:P_2O_5$ mol ratios in those titanium phosphate gels are given in Table 5.

(B) Reaction in the mixtures of the titanium phosphate gels with calcium hydroxide Each of the above obtained titanium phosphate gels was intimately mixed with the similar calcium hydroxide [$Ca(OH)_2$] as used in Example 2, at the mixing ratio of 3 mols of latter per mol of the phosphoric acid component ($P_2O_5$) in the gel, dried, and calcined in a porcelain crucible for an hour at 900° C. in an electric oven. Thus the reaction was completed in each mixture.

(C) Isolation of titanium oxide from each calcined product

The side-produced calcium phosphate was washed off from each of the calcined products, following the procedure C of Example 2. Thus titanium oxides containing no phosphoric acid component were obtained, which were subsequently dried at 110° C.

The products' crystal type as identified by X-ray diffraction, hiding power, whiteness, metallic impurities contents, and the recovery ratio of phosphoric acid component in each run, are given in Table 5.

From the results of these measurements, it can be understood that excellent titanium oxide can be obtained at various $TiO_2:P_2O_5$ mol ratios in the starting titanium phosphate gel.

nium phosphates were identified by means of X-ray diffraction, which revealed that the products treated at room temperature, 50° C. and 100° C. were amorphous, that treated at 500° C. showed sign of crystallization, and those treated at 800° C. and 1000° C. were perfect crystals.

The titanium phosphates were intimately mixed with caustic soda similarly to procedure B of Example 1, each at such a mixing ratio that 6 mols of caustic soda (NaOH) were present per mol of the phosphoric acid component ($P_2O_5$) in the titanium phosphate. The resultant mixtures were each separately treated at 100° C. for 2 hours and at 800° C. for an hour.

The dried and calcined products obtained by the above two types of treatments were each separated into the product titanium oxide and sodium phosphate, following the procedure C of Example 1.

The quantity of the sodium phosphate in each product was determined, and from which the de-phosphoric acid ratio from titanium phosphate was calculated. Also the titanium oxides were calcined at 1050° C., and identified of their crystal types by means of X-ray diffraction analysis. The results are given in Table 6.

From the results given in the table, it can be understood that excellent titanium oxide can be prepared when the reaction of titanium phosphate gel with phosphorus oxoacid-binder is performed at 800° C., regardless the state of the titanium phosphate, i.e., semi-dried, dried, or calcined at temperatures ranging from room temperature to 1000° C. Whereas, when the reaction is performed at the lower temperature of 100° C., the results are satisfactory with semi-dried or dried titanium phosphate, but the calcined product shows a tendency of reduced de-phosphoric acid ratio.

TABLE 6

| Treatment of titanium phosphate gel (° C.×hour) | Reaction of mixture (° C.×hour) | De-phosphoric acid ratio (percent) | X-ray diffraction diagrams |
|---|---|---|---|
| Room temp.×24 | 100×2 | 100 | Rutile. |
|  | 800×1 | 100 | Do. |
| 50×3 | 100×2 | 100 | Do. |
|  | 800×1 | 100 | Do. |
| 100×1 | 100×2 | 98.5 | Rutile anatase. |
|  | 800×1 | 100 | Rutile. |
| 500×0.5 | 100×2 | 91.3 | Rutile anatase. |
|  | 800×1 | 100 | Rutile. |
| 800×0.5 | 100×2 | 85.7 | Anatase. |
|  | 800×1 | 100 | Rutile. |
| 1,000×0.5 | 100×2 | 70.2 | Anatase titanium phosphate rutile. |
|  | 800×1 | 100 |  |

TABLE 5

| Starting titanium phosphate gel | | | Product titanium oxide | | | | | | | | | Recovery of phosphoric acid component (percent) |
|---|---|---|---|---|---|---|---|---|---|---|---|---|
| Phosphoric acid added during preparation (ml.) | $TiO_2:P_2O_5$ in the gel (mol ratio) | Hiding power | Reflectivity (percent), wave length mμ of— | | | | X-ray diffraction diagram | Metallic impurities | | | | |
|  |  |  | 350 | 400 | 500 | 600 |  | V | Fe | Al | Pb |  |
| 2.1 | 7.3:1 | 3.5 | 12.7 | 49.7 | 96.0 | 96.5 | Rutile | — | — | — | — | 100 |
| 3.1 | 5.3:1 | 3.4 | 15.4 | 52.5 | 96.0 | 96.5 | do | — | — | — | — | 100 |
| 3.6 | 4.4:1 | 3.4 | 17.0 | 62.5 | 96.5 | 96.5 | do | — | — | — | — | 100 |
| 5.1 | 3.5:1 | 3.4 | 16.4 | 61.5 | 96.5 | 96.5 | do | — | — | — | — | 100 |
| 15.0 | 1.5:1 | 3.3 | 17.3 | 64.0 | 97.2 | 98.0 | do | — | — | — | — | 100 |
| 24.0 | 1:1 | 3.3 | 18.0 | 67.0 | 98.0 | 98.5 | do | — | — | — | — | 100 |
| 30.0 | 1:1.7 | 3.4 | 20.5 | 69.5 | 98.5 | 98.5 | do | — | — | — | — | 100 |
| De-phosphoric acid with aqueous ammonia | 7.6:1 | 3.5 | 14.5 | 52.4 | 96.5 | 97.0 | do | — | — | — | — | 100 |
| Do | 10.5:1 | 3.5 | 13.2 | 51.5 | 96.0 | 96.5 | do | — | — | — | — | 100 |

EXAMPLE 5

Preparation of titanium oxide from titanium phosphates which were treated at various temperatures is explained in this example.

The titanium phosphate gel containing substantially no metallic impurities as prepared in accordance with procedure A of Example 1 was treated at various temperatures for different periods as follows: (at room temperature in a desiccator with desiccant) ×24 hours, 50° C. ×3 hours, 100° C. ×an hour, 500° C. ×30 minutes, 800° C. ×30 minutes, and 1000° C. ×30 mnutes. Thus obtained tita-

EXAMPLE 6

Preparations of titanium oxide using various phosphorus oxoacid-binders are explained in this example.

As the starting titanium phosphate material, the titanium phosphate gel as prepared by the procedure A of Example 1, which was substantially free of metallic impurities, was used.

As the phosphorus oxoacid-binders, the following 10 types were selected: $Na_2CO_3$, KOH, $K_2CO_3$, $CaCO_3$, $Mg(OH)_2$, $MGCO_3$, $Ba(OH)_3$, ZnO, $Al(OH)_3$, and $CaCl_2$.

The mixing of the gel with the binders was performed in accordance with procedure B of Example 1. The mixtures were calcined for 2 hours at 800° C. in the air.

Thus obtained calcined products were removed of the side-produced phosphates by procedure C of Example 2.

The de-phosphoric acid ratios in the runs, and X-ray diffraction diagrams of those titanium oxides which were subsequently calcined at 1,050° C., are given in Table 7.

From the same table, it can be understood that titanium oxide containing substantially no phosphoric acid component which is chemically bonded to the oxide can be obtained with the use of various phosphorus oxoacid-binders.

TABLE 7

| Phosphorus oxoacid binder | De-phosphoric acid ratio (percent) | X-ray diffraction diagram |
|---|---|---|
| $Na_2CO_3$ | 99 | Anatase. |
| KOH | 100 | Rutile. |
| $K_2CO_3$ | 99 | Anatase. |
| $CaCO_3$ | 98 | Do. |
| $Mg(OH)_2$ | 100 | Rutile. |
| $MgCO_3$ | 100 | Do. |
| $Ba(OH)_2$ | 100 | Do. |
| ZnO | 100 | Do. |
| $Al(OH)_3$ | 100 | Do. |
| $CaCl_2$ | 100 | Do. |

NOTE.—In case $CaCl_2$ was used there was observed generation of $Cl_2$.

EXAMPLE 7

Preparation of titanium oxide by treating the mixture of titanium phosphate gel with phosphorus oxoacid-binder at temperatures below 100° C. is explained.

As the starting titanium phosphate material, the titanium phosphate gel as prepared by procedure A of Example 1, which was substantially free of metallic impurities, was selected.

The gel was intimately mixed with caustic soda as the phosphorus oxoacid-binder, by the procedure B of Example 1.

The resultant mixture was treated in various ways as follows: standing in a desiccator with a desiccant (silica gel) at room temperature, and standing in drying ovens maintained at 50° C., 80° C. and 100° C. Thus four types of dry reaction products are obtained.

The side-produced phosphates were removed from the products in accordance with the procedure C of Example 1. The resultant titanium oxides as thoroughly washed with water were calcined at 1050° C.

The de-phosphoric acid ratio in each run was calculated from the quantity of the phosphate recovered. Also the water contents of the dry reaction products were determined. The product titanium oxides were identified by X-ray diffraction, and their hiding power was measured. Those results are given in Table 8.

From the same table, it can be understood that excellent titanium oxide can be prepared from the dry mixture of which water content is no more than 35%, in which the reaction between the phosphorus oxoacid-binder and titanium phosphate being completed.

TABLE 8

| Treating temperature (° C.) | Treating time | Water content of dry mixture (percent) | De-phosphoric acid ratio (percent) | X-ray diffraction diagram | Hiding power |
|---|---|---|---|---|---|
| Room temp. (in a desiccator). | 3 days | 35.5 | 100 | Rutile | 3.3 |
| 50 | 5 hours | 19.9 | 100 | do | 3.3 |
| 80 | 3 hours | 12.0 | 100 | do | 3.3 |
| 100 | 2 hours | 5.7 | 100 | do | 3.3 |

EXAMPLE 8

Preparation of titanium oxide at various mixing mol ratios of titanium phosphate gel with phosphorus oxoacid-binder is explained in this example.

As the starting titanium phosphate material, the substantially metallic impurities-free titanium phosphate gel as prepared in procedure A of Example 1 was selected.

As the phosphorus oxoacid-binder, caustic soda was used.

The above two materials were intimately mixed in the similar manner to procedure B of Example 1. In three runs, the quantity of caustic soda (NaOH) was varied as follows: 4 mols, 6 mols and 8 mols per mol of the phosphoric acid component in the titanium phosphate gel.

Thus obtained three mixtures were dried in a drying oven at 100° C. for 2 hours, and the dry matters were separated into sodium phosphate and titanium oxide in accordance with the procedure C of Example 1. The de-phosphoric acid ratios and X-ray diffraction diagrams of titanium oxides are given in Table 9.

The results indicate that at least the reaction equivalent to the phosphoric acid component ($P_2O_5$) in the titanium phosphate gel of phosphorus oxoacid-binder is required. (In the above case, 6 mols of NaOH per mol of $P_2O_5$.) Also it can be understood that the use of greater quantity of phosphorus oxoacid-binder causes little change in the results.

TABLE 9

| Quantity of caustic soda, mols (per mol of $P_2O_5$) | De-phosphoric acid ratio (percent) | X-ray diffraction diagrams |
|---|---|---|
| 4 | 59.8 | Anatase-type titanium phosphate. |
| 6 | 100 | Rutile. |
| 8 | 100 | Do. |

What is claimed is:

1. A process for the preparation of titanium dioxide which comprises intimately mixing a titanium salt of a phosphorus oxoacid with 1 to 3 equivalents, based on the phosphorus oxoacid component, of a phosphorus oxoacid-binder, said titanium salt of the phosphorus oxoacid being a hydrous gel or a dry amorphous gel and having the composition in terms of oxides of titanium and phosphorous components represented by the formula $$TiO_2:P_2O_5 = 1:1.0 \text{ to } 1:1.5$$

and using the water contained in the gel as a blending medium in the case of the hydrous gel, or adding water and using the added water as a blending medium in the case of a dry amorphous gel, said phosphorus oxoacid-binder being selected from the group of dry oxides and hydroxides of alkali metals and alkaline earth metals; drying the mixture at a temperature ranging from 50 to 400° C. for a time sufficient to form a solid phase reaction product consisting of very finely dispersed $TiO_2$ in the alkali metal or alkaline earth metal salt of the phosphorus oxoacid but which salt is chemically not bonded therewith; dipping the so obtained dried product into water or an aqueous solution of a mineral acid, thereby eluting out all of said salt of the phosphorus oxoacid produced as by-product; and thereafter recovering the resulting titanium dioxide and subsequently calcining same to produce an anatase or rutile titanium dioxide.

2. The process according to claim 1 wherein the resulting titanium oxide is calcined at a temperature ranging from 950 to 1100° C. to convert the titanium oxide to titanium oxide of rutile type.

3. The process according to claim 1 wherein the phosphorus oxoacid-binder is sodium hydroxide.

4. The process of claim 1 wherein said drying is conducted for a time of from 20 minutes to 3 hours.

(References on following page)

References Cited

UNITED STATES PATENTS

| | | | |
|---|---|---|---|
| 1,876,065 | 9/1932 | Llewellyn et al. | 23—105X |
| 1,953,777 | 4/1934 | Saklatwalla et al. | 23—105 |
| 2,055,221 | 9/1936 | Ravnestad | 23—202X |
| 2,068,877 | 1/1937 | Spence et al. | 23—105X |
| 2,505,344 | 4/1950 | Tanner | 23—202 |
| 2,516,548 | 7/1950 | Cauwenberg et al. | 23—202 |
| 3,027,228 | 3/1962 | Nielsen et al. | 23—105 |
| 3,178,303 | 4/1965 | Aagaard | 23—105X |
| 3,337,300 | 8/1967 | Hughes | 23—202 |
| 3,418,075 | 12/1968 | Piret | 23—105 |
| 3,471,252 | 10/1969 | Sugahara et al. | 23—105 |

FOREIGN PATENTS

| | | | |
|---|---|---|---|
| 1,355,809 | 2/1964 | France | 23—105 |

EDWARD STERN, Primary Examiner

U.S. Cl. X.R.

23—105